(12) United States Patent
Rusnak et al.

(10) Patent No.: US 12,210,517 B2
(45) Date of Patent: Jan. 28, 2025

(54) MAPS AUTO-COMPLETE THROUGH QUERY EXPANSION

(71) Applicant: Microsoft Technology Licensing, LLC, Redmond, WA (US)

(72) Inventors: Alexander Rusnak, Bellevue, WA (US); Dragomir Dimitrov Yankov, Palo Alto, CA (US); Shekoofeh Mokhtari, Sunnyvale, CA (US); Kupa Tsheko Muyambo Mutungu, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/483,436

(22) Filed: Sep. 23, 2021

(65) Prior Publication Data

US 2023/0029420 A1    Jan. 26, 2023

Related U.S. Application Data

(60) Provisional application No. 63/225,838, filed on Jul. 26, 2021.

(51) Int. Cl.
*G06F 16/242* (2019.01)
*G06F 16/29* (2019.01)
*G06F 40/274* (2020.01)

(52) U.S. Cl.
CPC .......... *G06F 16/2428* (2019.01); *G06F 16/29* (2019.01); *G06F 40/274* (2020.01)

(58) Field of Classification Search
None
See application file for complete search history.

(56) References Cited

U.S. PATENT DOCUMENTS

| | | | |
|---|---|---|---|
| 11,061,914 B2* | 7/2021 | Pengiel | G06F 16/953 |
| 2011/0201387 A1* | 8/2011 | Paek | G06F 3/0237 |
| | | | 455/566 |
| 2015/0006290 A1* | 1/2015 | Tomkins | G06Q 30/0256 |
| | | | 705/14.54 |
| 2016/0360382 A1* | 12/2016 | Gross | G06F 9/453 |
| 2017/0169007 A1* | 6/2017 | Francis | G06F 3/04883 |
| 2018/0060421 A1* | 3/2018 | Castelli | G06F 16/3338 |

(Continued)

OTHER PUBLICATIONS

Chen, et al., "GmailSmartCompose: Real-timeAssistedWriting", InProceedingsofthe25thACMSIGKDD InternationalConferenceonKnowledgeDiscovery&DataMining,Aug. 4, 2019,pp. 2287-2295. (Year: 2019).*

(Continued)

*Primary Examiner* — Matthew J Ellis
(74) *Attorney, Agent, or Firm* — RAY QUINNEY & NEBEKER P.C.; Paul N. Taylor (57) ABSTRACT

The present disclosure relates to systems, devices, and methods for suggesting geographic results to a user. The systems, devices, and methods may include receiving a prefix for a geographic query and ranking received candidate results for the prefix of the geographic query. The systems, devices, and methods may provide a query expansion based on a highest ranked candidate result. The systems, devices, and methods may determine a likelihood of the user selecting the query expansion, and if the likelihood exceeds a threshold, provide the query expansion.

18 Claims, 6 Drawing Sheets

(56) References Cited

U.S. PATENT DOCUMENTS

| | | | | |
|---|---|---|---|---|
| 2018/0349513 A1* | 12/2018 | Hornkvist | ......... | G06F 16/24578 |
| 2019/0171728 A1* | 6/2019 | Wakankar | ......... | G06F 16/90324 |
| 2020/0401629 A1* | 12/2020 | Lin | ................. | G06F 16/951 |
| 2021/0295822 A1* | 9/2021 | Tomkins | ................. | G06F 9/547 |
| 2022/0293128 A1* | 9/2022 | Min | .................. | G10L 15/08 |

OTHER PUBLICATIONS

Ziv Bar-Yossef, 2011, "Context-Sensitive Query Auto-Completion", https://www.researchgate.net/profile/Naama-Kraus/publication/221023908_Context-Sensitive_Query_Auto-Completion/links/0c960518602e9c5262000000/Context-Sensitive-Query-Auto-Completion.pdf (Year: 2011).*

Berkhin, et al., "A New Approach to Geocoding: BingGC", In Proceedings of the 23rd SIGSPATIAL International Conference on Advances in Geographic Information Systems, Nov. 3, 2015, 10 Pages.

Chen, et al., "Gmail Smart Compose: Real-time Assisted Writing", In Proceedings of the 25th ACM SIGKDD International Conference on Knowledge Discovery & Data Mining, Aug. 4, 2019, pp. 2287-2295.

Hofmann, et al., "An Eye-tracking Study of User Interactions with Query Auto Completion", In Proceedings of the 23rd ACM International Conference on Information and Knowledge Management, Nov. 3, 2014, pp. 549-558.

Kahneman, Daniel, "Thinking, Fast and Slow", In Publication of Farrar, Straus and Giroux, Oct. 25, 2011, 533 Pages.

Ke, et al., "LightGBM: A Highly Efficient Gradient Boosting Decision Tree", In Proceedings of the 31st International Conference on Neural Information Processing Systems, Dec. 4, 2017, 9 Pages.

Mitra, et al., "On User Interactions with Query Auto-Completion", In Proceedings of the 37th International ACM SIGIR Conference on Research & Development in Information Retrieval, Jul. 6, 2014, pp. 1055-1058.

Yankov, et al., "Evaluation of Explore-Exploit Policies in Multi-result Ranking Systems", In Repository of arXiv:1504.07662v1, Apr. 28, 2015, 9 Pages.

* cited by examiner

MAPS AUTO-COMPLETE THROUGH QUERY EXPANSION

CROSS-REFERENCE TO RELATED APPLICATIONS

This application claims priority to and the benefit of U.S. Provisional Patent Application No. 63/225,838, filed on Jul. 26, 2021, which is hereby incorporated by reference in its entirety.

BACKGROUND

Auto-complete is an integral service of all modern search engines. Auto-complete works in several stages: the user enters a query prefix; a set of candidate suggestions is retrieved from an index (e.g., a prefix tree); a ranker reorders the candidates; and the top five or so suggestions are displayed to the user. The suggestions are a reformulation of the query and are likely to produce more relevant search results.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example implementation relates to a method for suggesting geographic results to a user. The method may include receiving a prefix of a geographic query. The method may include ranking received candidate results for the prefix of the geographic query. The method may include based on the ranked candidate results, providing a query expansion of a highest ranked candidate result using two binary gating models, wherein the query expansion is provided at a mental pause point in the geographic query and the prefix of the geographic query is automatically updated with the query expansion.

Another example implementation relates to a method suggesting geographic results to a user. The method may include receiving a prefix of a geographic query. The method may include determining whether the user is at a mental pause point in the geographic query. The method may include if the user is not at the mental pause point, foregoing providing a query expansion. The method may include if the user is at the mental pause point, providing the query expansion by automatically updating the prefix of the geographic query with the query expansion.

Another example implementation relates to a system. The system may include more processors; memory in electronic communication with the one or more processors; and instructions stored in the memory, the instructions executable by the one or more processors to: receive a prefix of a geographic query; rank received candidate results for the prefix of the geographic query; and based on the ranked candidate results, provide a query expansion of a highest ranked candidate result using two binary gating models, wherein the query expansion is provided at a mental pause point in the geographic query and the prefix of the geographic query is automatically updated with the query expansion.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

This disclosure generally relates to map searches. Auto-complete, also referred to as auto suggestion, is an integral service of all modern search engines. Auto-complete or auto-suggestion is a proxy to formulate your query into search engines faster and generally makes the query more precise resulting in a higher likelihood that the search results meet the intent of the query. Auto-complete works in several stages: the user enters a query prefix; a set of candidate suggestions is retrieved from an index (e.g., a prefix tree); a ranker reorders the candidates; and the top five or so suggestions are displayed to the user.

Using Auto-complete in maps complements the functionality of map search engines. Users may formulate queries faster and provide better query formatting, which increases the chance of returning a relevant search result. However, maps Auto-complete differs from web search Auto-complete in several important aspects. For instance, in web search there are many head queries (queries issued by many people) and Auto-complete often suggests reformulations of the head queries that match the user typed prefix. As such, there are generally multiple potentially relevant results for the web search.

In map searches, head queries, which generally focus on primarily famous places (Paris) or points of interest (Eiffel Tower), occasionally occur. However, most of the queries in map searches, are tail queries (queries that are often issued just once). Also, in map searches, users are usually interested in one specific result (a geographic entity), such as, an address, a business, and/or a place that the users would like to visit. Generally, only one result is correct in map searches. Therefore, maps Auto-complete does not return query reformulations, but instead, provides a list of structured geographic entities that match the query prefix. If one of the structured geographic entities is selected, the map search engine (e.g., a geocoder) returns the same entity with the entity's location. In addition, in map searches a wrong results may come at a high cost to users. Small errors in the input query prefix may lead to valid yet unwanted results. For example, the users drive to unwanted locations, miss an appointment, or waste significant time. As such, bad results in map searches, unlike web searches, come at a high cost to users. Also, geographic entities, unlike common web search queries, contain terms that are hard to remember and easy to mistype (e.g., house or postal code numbers, complex road or business names, etc.).

Given the easily introduced errors in queries in map searches and a high cost of wrong results, suggestions that represent specific entities to help guide users in map searches may be beneficial to users. However, even if Auto-complete correctly identifies the most relevant suggestion, users often do not click on the suggestion or continue to type characters for the query prefix before selecting the relevant suggestion from Auto-complete. The users do not stop typing to check the suggestions after every typed character. Instead, the users keep typing until reaching a mental pause in the query (e.g., completed a term such as a word, number, acronym, or abbreviation or starting to type a new term) to review the suggestions provided by Auto-complete.

Text expansion (also known as "smart compose") has been used by some systems, such as, e-mail clients or text clients, for faster input. However, these systems derive the text expansion based on linguistic or personalized signals. For example, the linguistic is based on common terms that people use in a sentence (e.g., "see you <suggested expansion: later>") or frequent terms or phrases that the current user applies. Such language based completions are not suitable in the case of Auto-complete because often the terms that the text expansion systems infer do not appear in any of the Auto-complete suggestions. The Auto-complete service shows a set of suggestions for the query and the word expansions need to be related to the set of suggestions. Otherwise, the hinted expansions provided in the word expansions may be ambiguous and confuse users as to why such an expansion is being suggested to them.

The present disclosure uses maps Auto-complete to help users formulate a correct query by providing methods and systems that perform query expansions derived from a top set of suggestions in the Auto-complete ranked list of recommendations for the query prefix. The query expansion may be a word or phrase expansion based on the suggestions provided by the Auto-complete for the query prefix. The present disclosure may automatically complete the query prefix with the query expansion in the query input field. By generating word or phrase query expansions, users are more likely to engage with the Auto-complete suggestions. Moreover, query expansion helps users formulate a query faster, especially when unfamiliar and hard to spell geographic entity names are used in the query prefix. The present disclosure may use query expansion seamlessly with Auto-complete without additional overhead to users.

The present disclosure uses machine learning gating models to decide when to use query expansion for the query prefix. The machine learning models may provide the query expansion at a mental pause point in the query. The machine learning models also decide what query expansion to derive from the Auto-complete suggestions. The query expansion may be derived from a top ranked suggestion and the machine learning models may determine whether to provide a word expansion or a phrase expansion. The query expansion may be visually distinct from the query prefix (e.g., a different color) so that the user may easily identify the query expansion.

One technical advantage of some implementations of the present disclosure is providing the ranked suggestions at a mental pause point in the query (e.g., when the user stops typing after a term in the query or before starting a new term in the query). Providing the query expansion and/or the ranked suggestions at a break or pause in creating the query, results in the user being more receptive to the query expansion or the suggestions. Moreover, the query expansions allows the user to reach a mental pause point faster without introducing noise in the query.

Another technical advantage of some implementations of the present disclosure is compute savings. For every character that is typed in a map search, a request may be sent to backend servers to retrieve suggestions and rank the suggestions for the typed characters, which results in high queries per second on the servers and lots of computations by the servers. By using query expansion, the number of characters typed by the user may be reduced (e.g., reduced by a third or reduced by a half), resulting in a reduction in processing costs and the demand on the servers by providing less queries on typed characters.

As such, the present disclosure provides benefits to map searching by helping users engage with Auto-complete by using query expansion to find the results quicker for a prefix of a geographic query. The present disclosure facilitates the user experience in map searching by reducing the time to reach the intent of a geographic query and increase a likelihood of receiving the correct results for a geographic query.

Figure 1:
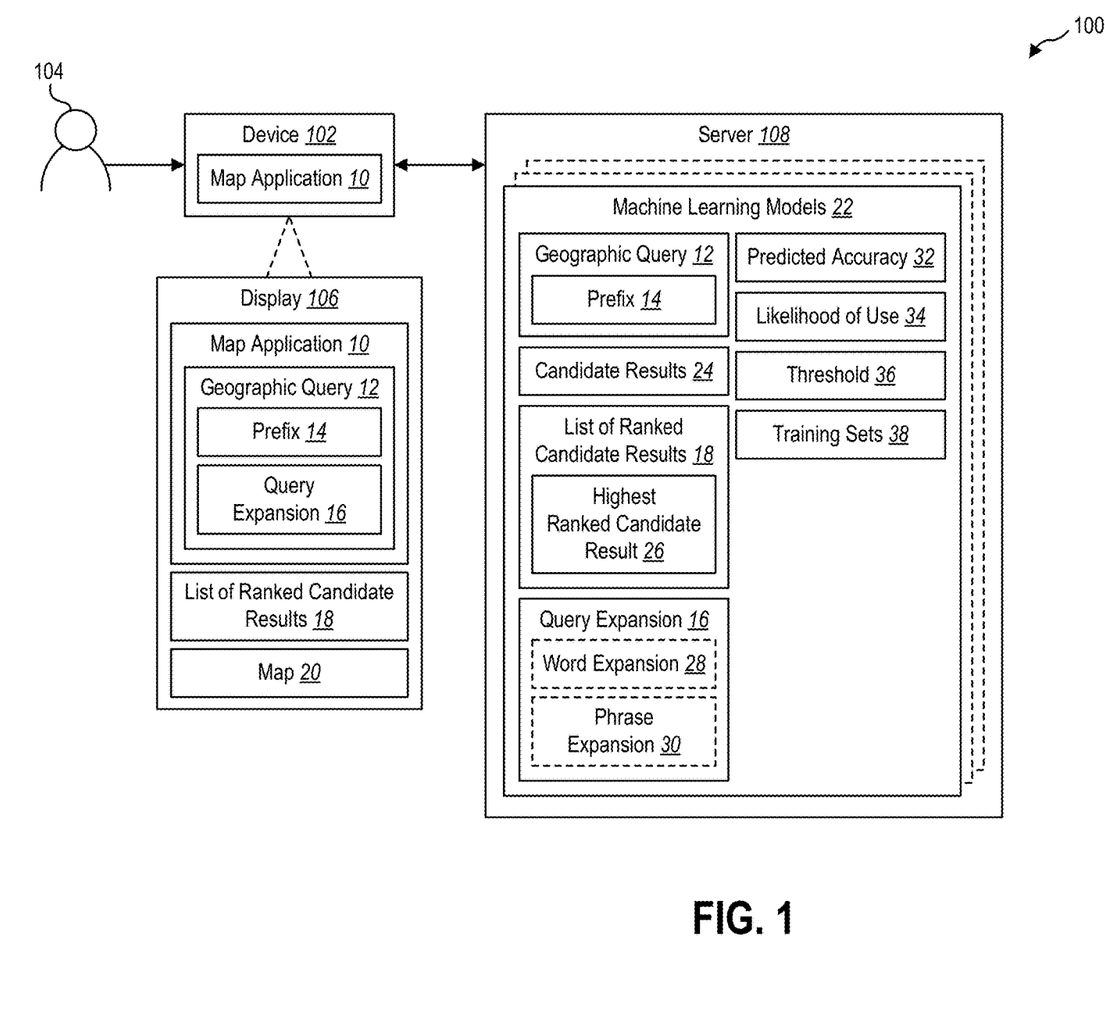
FIG. 1 illustrates an example environment for providing query expansions in accordance with implementations of the present disclosure.

Referring now to FIG. 1, illustrated is an example environment 100 for providing query expansions 16 for map searches. The environment 100 may include a plurality of devices 102 in communication with one or more servers 108. The devices 102 may include a map application 10 that provides geographic information to users 104. The devices 102 may be in communication with one or more displays 106 where the map application 10 displays maps 20 and allows the users 104 to search for various geographic entities on the maps 20. The users 104 may provide one or more geographic queries 12 for the geographic entities using, for example, a search input field. Geographic entities may include, but are not limited to, a place (countries, states, towns, cities, counties, parks, regions, points of interest (POIs), residence, etc.), an address, a business, categories (e.g., coffee shop, restaurants, etc.), and/or any other spatial entity on the map 20.

The geographic query 12 may be a partial query (e.g., not a fully formed query), and in the context of Auto-complete, the geographic query 12 may be called a prefix 14. The prefix 14 of the geographic query 12 may include characters or numbers. The prefix 14 may include words, phrases, and/or numbers. In addition, the prefix 14 may include a partial word and/or a partial phrase. One example use case is for a geographic query 12 for "Bellevue," the prefix 14 may include any combination of characters with a portion of the geographic query 12 (e.g., "b", "be", "bel", "bell", "belle", "bellev", "bellevu").

The characters and/or numbers of the prefix 14 for the geographic query 12, may be sent to a machine learning system with one or more machine learning models 22 running on one or more servers 108 for processing. In some implementations, as the characters and/or numbers of the prefix 14 are typed, the characters and/or numbers are sent to the machine learning models 22 for processing. In some implementations, a group of characters and/or numbers of the prefix 14 are sent to the machine learning models 22 for processing. For example, two or three characters or numbers are sent at a time. Another example includes sending the characters or numbers of the prefix 14 for processing after a minimum number is reached (sending after three characters or numbers are entered).

The machine learning models 22 may receive the prefix 14 for the geographic query 12 and may receive candidate results 24 for the prefix 14 from an Auto-complete service for the map application 10. The candidate results 24 may include one or more suggestions for the prefix 14 generated by the Auto-complete service for the map application 10.

The machine learning models 22 may rank the candidate results generating a list of ranked candidate results 18. The ranking may be based on geographic relevance to a current location of the user 104. For example, suggestions that are nearby the current geographic location of the user 104 are placed higher in the list of ranked candidate results 18 relative to suggestions further away from the current geographic location of the user 104. The rankings may also be based on whether terms or numbers from the prefix 14 appear in the suggestions. For example, suggestions with terms or numbers from the prefix 14 may appear higher in the list of ranked candidate results 18 relative to suggestions without the terms or numbers from the prefix 14.

The machine learning models 22 may identify a highest ranked candidate result 26 from the list of ranked candidate results 18 and may perform a query expansion 16 based on the highest ranked candidate result 26. The query expansion 16 may complete the prefix 14 of the geographic query 12 with words or phrases based on the highest ranked candidate result 26. The query expansion 16 may include a word expansion 28 or a phrase expansion 30. For example, the prefix 14 is "bell" and the highest ranked candidate result 26 is "Bellevue," the query expansion 16 may automatically complete the prefix 14 with the expansion suffix "evue" to form the word "Bellevue" for the geographic query 12.

The machine learning models 22 may also use a variety of factors in combination with the highest ranked candidate result 26 in deriving the query expansion 16. One example factor includes a relevance of the suggestions in the list of ranked candidate results 18 to the prefix 14. Another example factor includes word boundaries (e.g., determining whether the user 104 has completed typing one word to start another word). Another example factor includes distance from the suggestions included in the list of ranked candidate results 18 to a current location of the user 104. Another example includes determining how many other suggestions included in the list of ranked candidate results 18 includes the words or phrases included in the query expansion 16. Another example includes query prefix and expansion suffix lengths (e.g., the length in characters of what is typed and hinted as the expansion). As such, the query expansion 16 may expand the prefix 14 with words or phrases derived from the suggestions in the list of ranked candidate results 18 based on a combination of the factors and the highest ranked candidate result 26.

The query expansion 16 may be sent to the device 102 and the prefix 14 of the geographic query 12 may be automatically updated with the query expansion 16. The user 104 may complete the map search using the hint provided for the geographic query 12. The map application 10 may also display a map 20 showing the location for the geographic query 12. In some implementations, the list of ranked candidate results 18 is sent to the device 102 and the map application 10 also presents the list of ranked candidate results 18 nearby, or adjacent to, the input field for the geographic query 12. As such, the user 104 may select another suggestion for the geographic query 12 from the list of ranked candidate results 18 for the map search.

In some implementations, the machine learning models 22 may perform a gate function to determine when to perform the query expansion 16. The machine learning models 22 may provide the query expansion 16 at a mental pause point in the geographic query 12. A mental pause point in the geographic query 12 may occur when the user 104 pauses when providing the prefix 14. An example of a mental pause point is after the user 104 completes a term (e.g., a word, a number, an acronym, or an abbreviation) in the prefix 14 of the geographic query 12. Another example of a mental pause point is when the user 104 starts to provide a new term in the prefix 14 of the geographic query 12. The machine learning models 22 may determine whether the user 104 is at a mental pause point in the geographic query 12 by, for example, detecting an entered space character by the user 104 or detecting a pause in the user 104 typing or speaking characters for the geographic query 12.

The machine learning models 22 may predict a likelihood of use 34 of the query expansion 16. In addition, the machine learning models 22 may predict an accuracy 32 of the query expansion 16. The machine learning models 22 may use a variety of factors in determining the predicted accuracy 32 of the query expansion 16 and/or the likelihood of use 34 of the query expansion 16. Example factors include, but are not limited to, features related to the prefix 14 (e.g., how many characters are included in the prefix 14, how many terms are included in the prefix 14, does the prefix contain a number); features related to individual entities in the suggestions provided by the Auto-complete (are the ranked candidate results 18 a place, an address, or business, and/or a distance from the ranked candidate results 18 to a current location of the user 104); features related to both the prefix 14 and the individual entities in the suggestions provided by the Auto-complete (e.g., how similar (cosine similarity) is the prefix to the ranked candidate results 18); and/or features related to all suggestions provided by the Auto-complete (e.g., whether the query expansion 16 is supported by other candidates included in the list of ranked candidate results 18).

The machine learning models 22 may compare the likelihood of use 34 and/or the predicted accuracy 32 to a threshold 36. If the likelihood of use 34 of the query expansion 16 and/or the predicted accuracy 32 exceeds the threshold 36, the machine learning models 22 may determine to perform the query expansion 16. If the likelihood of use 34 and/or the predicted accuracy 32 are below the threshold 36, the machine learning models 22 may determine to forego performing the query expansion 16.

The machine learning models 22 may be trained using training sets 38 of data based on conversations (e.g., interactions with map searches). The training sets 38 may be based on previous searches performed by the user 104 using the map applications 10. In addition, the training sets 38 may be based on map searches performed by a plurality of users of the environment 100. The machine learning models 22 may track the interactions of the map searches in the training sets 38 with the candidate results 24 generated from the Auto-Complete service for the maps 20 to make determinations of when the candidate results 24 is selected for the geographic query 12 and when the candidate results 24 are not selected for the geographic query 12. The training sets 38 generate all the possible query expansions 16 that may be created based on the past conversations of what the users 104 typed and the machine learning models 22 may use the training sets 38 to predict a likelihood of use 34 by the user 104 of the query expansion 16. In addition, the machine learning models 22 may use the training sets 38 to determine a predicted accuracy 32 of the query expansion 16. By determining the predicted accuracy 32 of the query expansion 16, the machine learning models 22 may prevent ambiguous results for the prefix 14 by waiting to perform the query expansion 16 until the predicted accuracy 32 exceeds the threshold 36.

In an implementation, the machine learning models 22 include two binary gating models (a word expansion model and a phrase expansion model). The word model predicts the probability that a user will type a word matched from the highest ranked candidate result 26 (e.g., a top suggestion in the list of ranked candidate results 18), or the following word, if the user is at the start of a new word. The phrase model predicts the probability of typing whole phrase. A phrase is the consecutive terms in a geo-ontology element (e.g., address line (house number with road name) in an address, city name, business or place name, etc.). The word model may provide a confidence score with the predicted probability that the user 104 will type a word matched from the highest candidate result 26 and the phrase model may provide a confidence score with the predicted probability that the user 104 will type a phrase. If the phrase model has a lower confidence score relative to the confidence score of the word model, the machine learning models 22 may provide a word expansion for the query expansion 16. If the phrase model has the same or higher confidence score relative to the confidence score of the word model, the machine learning models 22 may provide a phrase expansion for the query expansion 16.

The machine learning models 22 may also include gradient boosting decision trees (e.g., a LightGBM). As such, a combination of different machine learning models 22 may be used to determine when to perform the query expansion 16 and to derive which query expansion 16 to provide as a hint for completing the prefix 14.

The machine learning models 22 may limit the query expansion 16 based on the predicted accuracy 32. One example use case is a prefix 14 for "123 music" and the list of ranked candidate results 18 includes "(1) 123 Music Concourse, San Francisco; (2) 123 Music Concourse, New York." The machine learning models 22 may have a high predicted accuracy 32 for the query expansion "123 music concourse" but a lower predicted accuracy 32 for the query expansion "123 music concourse, San Francisco" since multiple results in the list of ranked candidate results 18 may be relevant to the prefix 14 "123 music." As such, the machine learning models 22 may provide the query expansion "123 music concourse" based on the predicted accuracy 32 for the query expansion 16 being above a threshold 36. The machine learning models 22 may provide a second query expansion 16 (e.g., New York or San Francisco) based on whether the user adds any additional characters to the geographic query 12. As such, multiple query expansions 16 may be provided for a geographic query 12.

The machine learning models 22 may perform the processing on the prefix 14 quickly to determine whether to perform the query expansion 16 and provide the query expansion 16 to the device 102 to prevent the user from observing latency when typing in the geographic query 12.

The environment 100 may have multiple machine learning models 22 running simultaneously. In some implementations, one or more computing devices (e.g., servers 108 and/or devices 102) are used to perform the processing of environment 100. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the machine learning models 22 are implemented wholly on the same computing device. Another example includes one or more subcomponents of the machine learning models 22 implemented across multiple computing devices. Moreover, in some implementations, the machine learning models 22 are implemented or processed on different server devices of the same or different cloud computing networks.

In some implementations, each of the components of the environment 100 is in communication with each other using any suitable communication technologies. In addition, while the components of the environment 100 are shown to be separate, any of the components or subcomponents may be combined into fewer components, such as into a single component, or divided into more components as may serve a particular embodiment. In some implementations, the components of the environment 100 include hardware, software, or both. For example, the components of the environment 100 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 100 include hardware, such as a special purpose processing device to perform a certain function or group of functions. In some implementations, the components of the environment 100 include a combination of computer-executable instructions and hardware.

As such, the environment 100 may be used to facilitate the user experience in map searching by using query expansion 16 to automatically expand the prefix 14 of the geographic query 12. The environment 100 may increase a likelihood of receiving the correct results for a geographic query 12 by determining the query expansion 16 based on a highest ranked candidate result 26 in a list of ranked candidate results 18 of suggestions provided by the Auto-complete service for the map application 10.

The environment 100 may also be used for query expansions 16 to complement other searches. For example, the user 104 may enter in a prefix 14 for a general search for a restaurant. The machine learning models 22 may access the information from the Auto-complete for the maps application 10 based on the intent of the general search (e.g., a restaurant) and use the list of candidate results 24 for the restaurant to generate a query expansion 16 for the general search. The environment 100 may also be used for query expansions 16 in other areas of searching where the user 104 may search for domain specific searches (e.g., searching for a specific intent).

Figure 2:
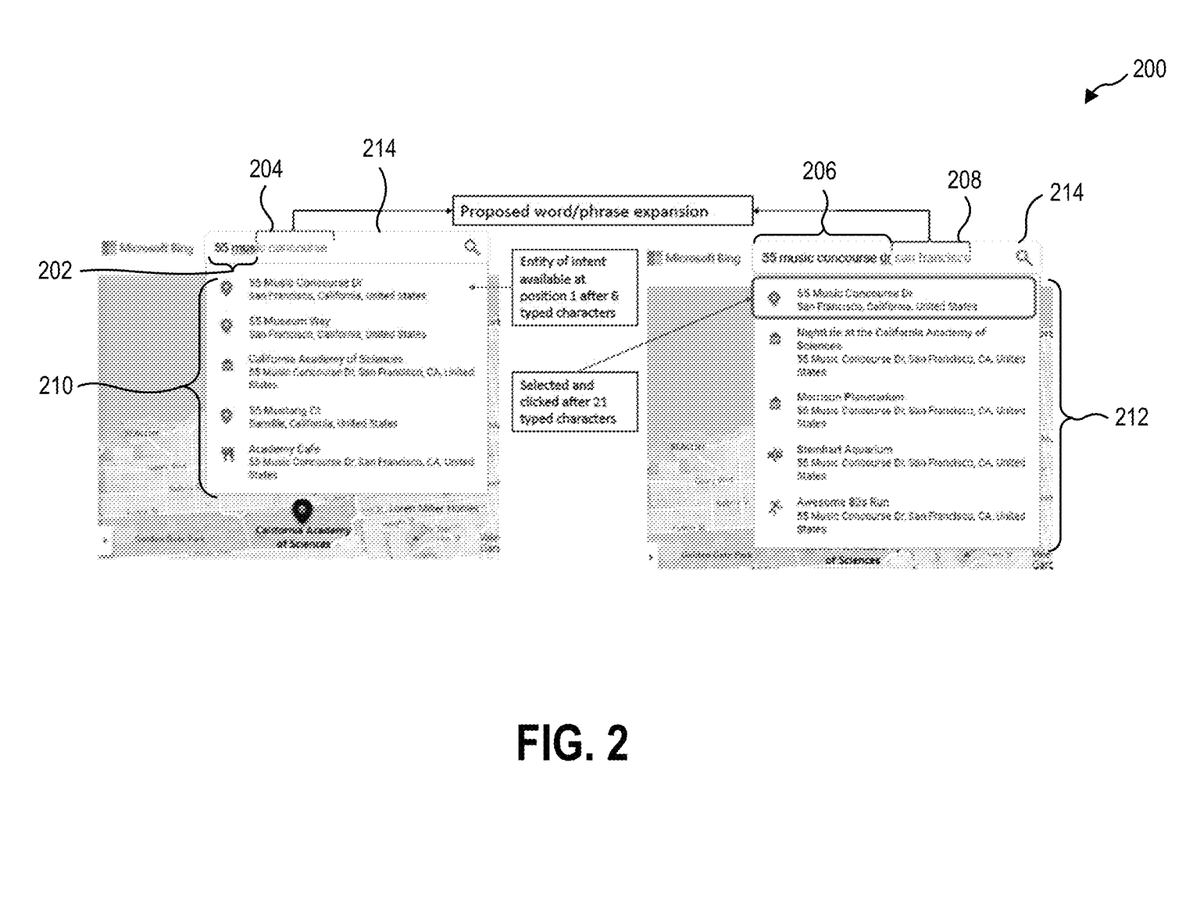
FIG. 2 illustrates an example graphical user interface with a plurality of prefixes and a plurality of query expansions in accordance with implementations of the present disclosure.

Referring now to FIG. 2, illustrated is an example graphical user interface (GUI) 200 displayed on a display 106 (FIG. 1) showing different query expansions 204, 208 for different prefixes 202, 206 for a geographic query 12 (FIG. 1). In the first example, the query prefix 202 "55 mus" has 6 characters (including spaces) and a query expansion 204 "ic concourse" is provided to complete the geographic query 12 as "55 music concourse." The query expansion 204 is derived from the list of ranked candidate results 210 generated based on the query prefix 202 "55 mus." The top suggestion in the list of ranked candidate results 210 is "55 Music Concourse Dr" and the machine learning models 22 (FIG. 1) may determine that the predicted accuracy 32 of the query expansion 204 "ic concourse" exceeds a threshold (e.g., 95% accurate). The predicted accuracy 32 of the query expansion 204 may be based on the additional suggestions included in the list of ranked candidate results 210. For example, three out of the five results included in the list of ranked candidate results 210 include "55 Concourse Dr." The machine learning models 22 may identify the geographic intent for the geographic query 12 using the list of ranked candidate results 210 and other factors (e.g., a current geographic location of the user) to provide the query expansion 204. The prefix 202 may be automatically completed using the query expansion 204.

The query expansion 204 may be visually distinct from the characters that the user 104 typed for the prefix 202. For example, the prefix 202 characters "55 mus" may be the color black and the query expansion 204 characters "ic concourse" may be light grey text in the input field 214 for the geographic query 12. By providing a visual distinction for the query expansion 204, the users 104 may reach a mental pause in typing the prefix 202 to select the query expansion 204 without introducing noise in the geographic query 12. The user 104 may complete the geographic query 12 using the query expansion 204 provided in the input field 214.

The user 104 may also continue to type additional characters into the query prefix 202. In the second example, the query prefix 206 "55 music concourse dr" has 21 typed characters including spaces and a query expansion 208 "San Francisco" is provided to complete the geographic query 12 as "55 music concourse dr San Francisco." The query expansion 208 is derived by the machine learning models 22 based on the list of ranked candidate results 212 provided based on the query prefix 206 "55 music concourse dr." For example, all of the suggestions included in the list of ranked candidate results 210 include "55 music concourse dr., San Francisco." As such, the machine learning models 22 provide the query expansion 208 "San Francisco" to the device 102 and the prefix 206 may be automatically completed with the query expansion 208. The query expansion 208 may be visually distinct from the characters that the user 104 typed for the prefix 206. For example, the prefix 206 characters "55 music concourse dr" may one color and the query expansion 208 text "San Francisco" may be a different color in the input field 214 for the geographic query 12. The user 104 may complete the geographic query 12 using the query expansion 208.

As the number of characters change in the query prefixes 202, 206 different list of ranked candidate results 210, 212 may be provided for the query prefixes 202, 206. Moreover, as the number of characters change in the query prefixes 202, 206, the query expansions may remain the same or provide additional details to the query prefixes 202, 206.

Figure 3:
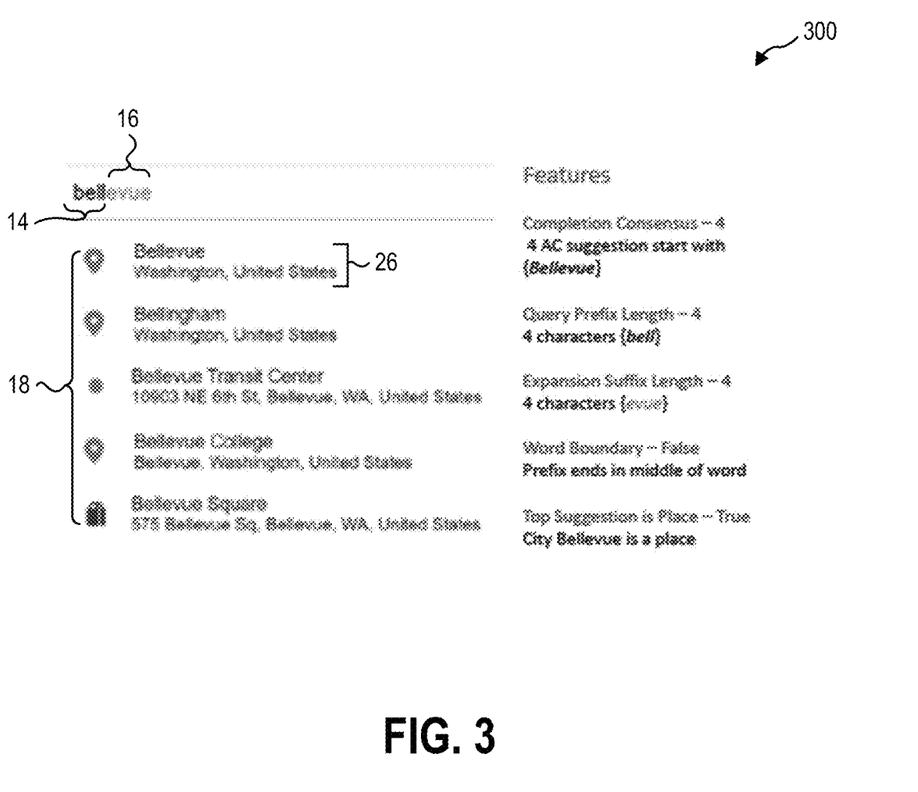
FIG. 3 illustrates an example graphical user interface with a prefix and a query expansion in accordance with implementations of the present disclosure.

Referring now to FIG. 3, illustrated is an example of an example graphical user interface (GUI) 300 displayed on a display 106 (FIG. 1) showing a query expansion 16 for a prefix 14 for a geographic query 12 (FIG. 1). The prefix 14 includes the characters "bell." A list of ranked candidate results 18 is generated by the Auto-complete service for the map application 10 (FIG. 1) based on the prefix 14. The list of ranked candidate results 18 includes five results (1) Bellevue; (2) Bellingham; (3) Bellevue Transit Center; (4) Bellevue College; and (5) Bellevue Square, with the highest ranked candidate result 26 "Bellevue" listed first at the top of the list.

The machine learning models 22 may use a variety of factors in determining the query expansion 16 "evue" to complete the geographic query 12 as "Bellevue." One example factor that the machine learning models 22 use includes complete consensus (how many of the suggestions provided by the Auto-complete service have the word or phrase included in the query expansion 16). For example, four of the suggestions included in the Auto-complete list of ranked candidate results 18 include "Bellevue." Another example factor that the machine learning models 22 use includes query prefix length (e.g., 4 characters are typed in the prefix 14). Another example factor that the machine learning models 22 use includes expansion suffix length (e.g., 4 characters are hinted as the expansion). Another example factor that the machine learning models 22 use includes word boundary considerations (e.g., whether the prefix 14 ends in the middle of the word or if the user has completed typing one word). Another example factor that the machine learning models 22 use includes determining what type of geo-entity is the top suggestion in the list of ranked candidate results 18 (e.g., whether the top entity is a place, address, business, etc.). As such, the machine learning models 22 may derive the words or phrases to include in the query expansion 16 from the list of ranked candidate results 18 based on the highest ranked candidate result 26 in combination with a variety of factors. The query expansion 16 may be visually distinct from the prefix 14 characters so that the user 104 may easily identify the recommended text provided in the query expansion 16.

Figure 4:
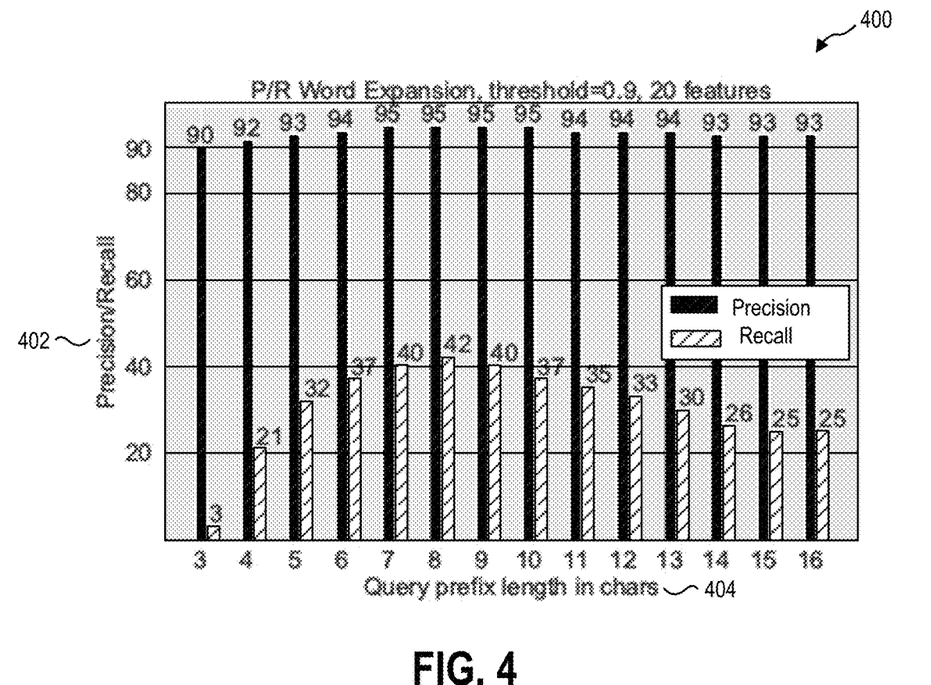
FIG. 4 illustrates an example graph showing precision for word query expansions in accordance with implementations of the present disclosure.

Referring now to FIG. 4, illustrated is an example graph 400 illustrating precision and recall for a query prefix 14 (FIG. 1) for a word expansion 28 (FIG. 1). The graph 400 has an x-axis 404 illustrating the query prefix length in characters (e.g., the number of characters typed in the prefix 14 of the geographic queries 12) and a y-axis 402 illustrating the precision of the machine learning models 22 (FIG. 1). The y-axis 402 illustrates the precision and recall of the machine learning models 22 for thresholds of the models' scores set at 0.9 and above for the machine learning models 22 generating the word expansions 28. The graph 400 illustrates the corresponding precision and recall values broken down by the number of characters typed. The recall shows the number of queries where the word expansion 28 is provided. The precision shows whether the machine learning models 22 suggested the correct word expansion 28 selected by the user 104 to perform the map search. For example, in forty two percent of the total queries for eight character prefixes 14, the machine learning models 22 determined to provide the word expansion 28 with a ninety five percent accuracy.

Figure 5:
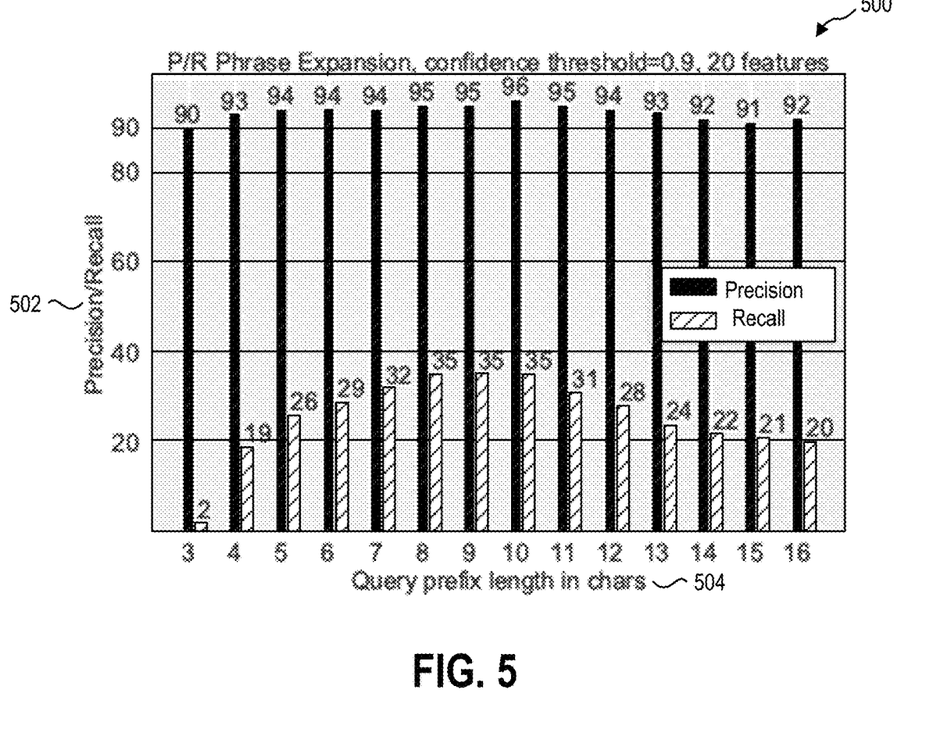
FIG. 5 illustrates an example graph showing precision for phrase query expansions in accordance with implementations of the present disclosure.

Referring now to FIG. 5, illustrated is an example graph 500 illustrating precision and recall for a query prefix 14 (FIG. 1) for a phrase expansion 30 (FIG. 1). The graph 500 has an x-axis 504 illustrating the query prefix length in characters (e.g., the number of characters typed in the prefix 14 of the geographic queries 12) and a y-axis 502 illustrating the precision of the machine learning models 22 (FIG. 1). The y-axis 502 illustrates the precision and recall of the machine learning models 22 for thresholds of the models' score set at 0.9 and above for the machine learning models 22 generating the phrase expansions 30 (e.g., the graph 500 shows that when the prefix length is seven characters, the machine learning models 22 with a threshold 0.9 are able to suggest the phrase expansions 30 for 32% of the geographic queries 12 (recall) and these suggestions are correct in 94% of the cases (precision)). The graph 500 illustrates the corresponding precision and recall values broken down by the number of characters typed. The recall shows the number of queries where the phrase expansion 30 is provided. The precision shows whether the machine learning models 22 suggested the correct phrase expansion 30 selected by the user 104 to perform the map search. For example, in 34 percent of the total queries with nine characters typed in the prefix 14, the machine learning models 22 determined to provide the phrase expansion 30 with a ninety five percent accuracy.

Figure 6:
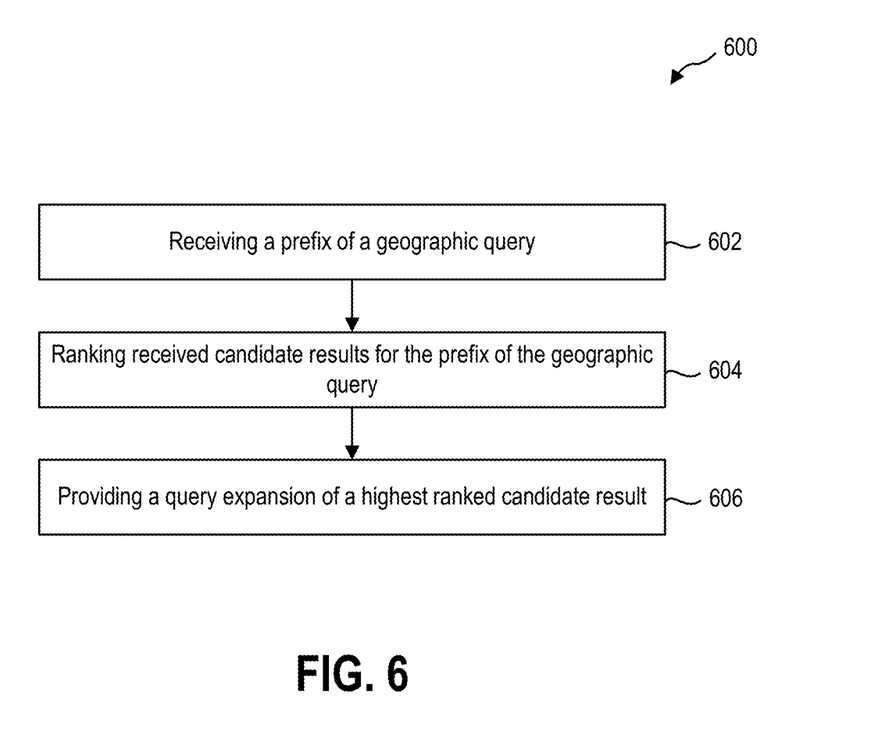
FIG. 6 illustrates an example method for suggesting geographic results to a user in accordance with implementations of the present disclosure.

Referring now to FIG. 6, illustrated is an example method 600 for suggesting geographic results to a user 104 (FIG. 1). The actions of method 600 may be discussed below with reference to the architecture of FIG. 1.

At 602, the method 600 includes receiving a prefix of a geographic query. The geographic query 12 may be for a geographic entity, such as, but not limited to, a place (countries, states, towns, cities, counties, parks, regions, points of interest (POIs), residence, etc.), an address, a business, categories (e.g., coffee shop, restaurants, etc.), and/or any other spatial entity on the map 20. The geographic query 12 may be a whole word or a whole phrase. The geographic query 12 may be a partial query (e.g., not a fully formed query or a portion of the query), and in the context of Auto-complete, the geographic query 12 may be called a prefix 14. The prefix 14 includes characters or numbers. The prefix 14 may include a full word, a phrase, and/or numbers. In addition, the prefix 14 may include a partial word and/or phrase. One or more machine learning models 22 may receive the prefix 14 for the geographic query 12 for processing.

At 604, the method 600 includes ranking received candidate results for the prefix of the geographic query. The machine learning models 22 may also receive candidate results 24 for the prefix 14 from an Auto-complete service for the map application 10. The candidate results 24 may include one or more suggestions for the prefix 14 generated by the Auto-complete service for the map application 10. The machine learning models 22 may aggregate the candidate results 24 into a list of the candidate results 24 based on the prefix 14 of the geographic query 12.

The machine learning models 22 may also rank the candidate results generating a list of ranked candidate results 18. The ranking may be based on a geographic relevance to a current geographic location of the user 104. For example, suggestions that are located nearby the current geographic location of the user 104 are placed higher in the list of ranked candidate results 18 relative to suggestions located further away from the current geographic location of the user 104. The rankings may also be based on whether terms or numbers from the prefix 14 appear in the suggestions. For example, suggestions with terms or numbers from the prefix 14 may appear higher in the list of ranked candidate results 18 relative to suggestions without the terms or numbers from the prefix 14.

At 606, the method 600 includes providing a query expansion of a highest ranked candidate result. The machine learning models 22 may identify a highest ranked candidate result 26 from the list of ranked candidate results 18 and perform a query expansion 16 based on the highest ranked candidate result 26. The query expansion 16 may automatically complete the prefix 14 of the geographic query 12 with words or phrases based on the highest ranked candidate result 26. The query expansion 16 may include a word expansion 28 or a phrase expansion 30.

The machine learning models 22 may provide the query expansion 16 at a mental pause point in the geographic query 12. A mental pause point in the geographic query 12 may occur when the user 104 pauses typing the prefix 14. An example of a mental pause point is after the user 104 completes a term (e.g., a word, a number, an acronym, or an abbreviation) in the prefix 14 of the geographic query 12. Another example of a mental pause point is when the user 104 starts to type a new term in the prefix 14 of the geographic query 12. The machine learning models 22 may determine whether the user 104 is at a mental pause point in the geographic query 12 by, for example, detecting an entered space character by the user 104 or other word boundary entered by the user 104. The machine learning models 22 may also detect a pause in the user 104 typing characters in the geographic query 12. At mental pause points (e.g., when the user 104 stops typing), the user 104 may be more open to reviewing the suggestion provided for the query expansion 16.

In an implementation, the machine learning models 22 include two binary gating models (a word expansion model and a phrase expansion model). The word model predicts the probability that a user will type a word matched from the highest ranked candidate result 26 (e.g., a top suggestion in the list of ranked candidate results 18), or the following word, if the user is at the start of a new word. The phrase model predicts the probability of typing whole phrase. A phrase is the consecutive terms in a geo-ontology element (e.g., address line (house number with road name) in an address, city name, business or place name, etc.). The word model may provide a confidence score with the predicted probability that the user 104 will type a word matched from the highest candidate result 26 and the phrase model may provide a confidence score with the predicted probability that the user 104 will type a phrase. If the phrase model has a lower confidence score relative to the confidence score of the word model, the machine learning models 22 may provide a word expansion for the query expansion 16. If the phrase model has the same or higher confidence score relative to the confidence score of the word model, the machine learning models 22 may provide a phrase expansion for the query expansion 16.

The machine learning models 22 may also use a variety of factors in combination with the highest ranked candidate result 26 in deriving the words or phrases to use in the query expansion 16. One example factor includes a relevance of the suggestions in the list of ranked candidate results 18 to the prefix 14. Another example factor includes word boundaries (e.g., determining whether the user 104 has completed typing one word to start another word). Another example factor includes distance from the suggestions included in the list of ranked candidate results 18 to a current location of the user 104 (e.g., how far the candidates are located from a current location of the user 104). Another example includes determining how many other suggestions included in the list of ranked candidate results 18 includes the words or phrases included in the query expansion 16. Another example factor that the machine learning models 22 use includes completion consensus (whether other suggestions provided by the Auto-complete service include the words or phrases in the query expansion 16). Another example factor that the machine learning models 22 use includes query prefix length (e.g., the number of characters of the prefix). Another example factor that the machine learning models 22 use includes expansion suffix length (e.g., the number of characters of the suffix). Another example factor that the machine learning models 22 use includes word boundary considerations (e.g., whether the prefix 14 ends in the middle of the word or if the user 104 has completed a word). Another example factor that the machine learning models 22 use includes determining what type of geo-entity is the top suggestion in the list of ranked candidate results 18 (e.g., is the top suggestion a place, address, business, etc.).

As such, the machine learning models 22 may derive the query expansion 16 from the list of ranked candidate results 18 based on the highest ranked candidate result 26 in combination with a variety of factors. The query expansion 16 may expand the prefix 14 with words or phrases from the suggestions in the list of ranked candidate results 18 based on a combination of the factors and the highest ranked candidate result 26.

The query expansion 16 may be sent to the device 102 and the prefix 14 of the geographic query 12 may be automatically updated with the query expansion 16. The query expansion 16 may be a word expansion 28 or a phrase expansion 30. In addition, the query expansion 16 may be visually distinct from the prefix 14 characters so that the user 104 may easily identify the recommended text provided in the query expansion 16. In some implementations, the list of ranked candidate results 18 are displayed nearby, next to, or adjacent to, the geographic query 12.

As such, the method 600 may allow the user 104 to reach a mental pause point faster without introducing noise in the geographic query 12. The method 600 may also be used to reduce the number of characters typed to complete the geographic query 12 by automatically completing the geographic query 12 with the query expansion 16. In addition, the method 600 may reduce an amount of time for completing the geographic query 12.

Figure 7:
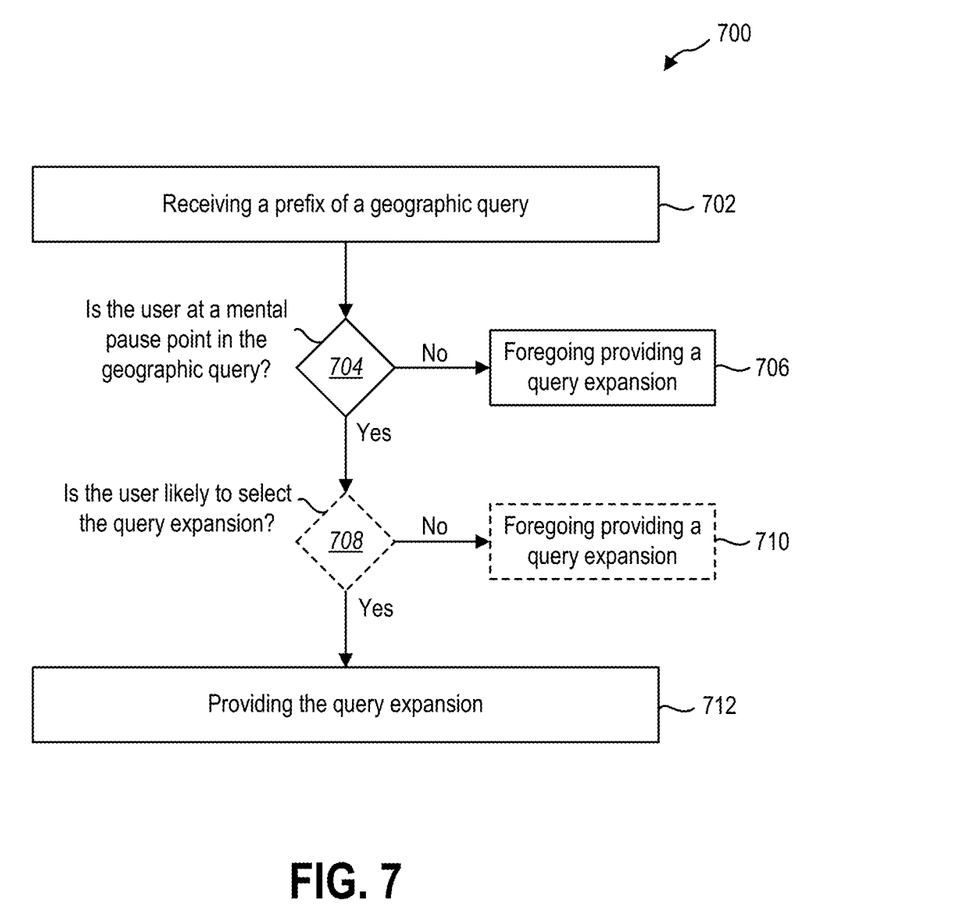
FIG. 7 illustrates an example method for suggesting geographic results to a user in accordance with implementations of the present disclosure.

Referring now to FIG. 7, illustrated is an example method 700 for suggesting geographic results to a user 104 (FIG. 1). The actions of method 700 may be discussed below with reference to the architecture of FIG. 1.

At 702, the method 700 includes receiving a prefix of a geographic query. The geographic query 12 may be for a geographic entity, such as, but not limited to, a place, an address, a business, a point of interest, a place (countries, states, towns, cities, counties, parks, regions, points of interest (POIs), residence, etc.), an address, a business, categories (e.g., coffee shop, restaurants, etc.), and/or any other spatial entity on the map 20. The geographic query 12 may be a partial query (e.g., not a fully formed query or a portion of the query), and in the context of Auto-complete, the geographic query 12 may be called a prefix 14. The prefix 14 includes characters or numbers. The prefix 14 may include a full word, a phrase, and/or numbers. In addition, the prefix 14 may include a partial word and/or phrase. One or more machine learning models 22 may receive the prefix 14 for the geographic query 12 for processing.

At 704, the method 700 includes determining whether the user is at a mental pause point in the geographic query. A mental pause point in the geographic query 12 may occur after the user 104 completes a term (e.g., a word, a number, an acronym, or an abbreviation) in the geographic query 12. A mental pause point in the geographic query 12 may also occur when the user 104 starts to type a new term in the geographic query 12. The machine learning models 22 may determine whether the user 104 is at a mental pause point in the geographic query 12. For example, the machine learning models 22 use an entered space character or other word boundary to determine whether a term is completed in the geographic query 12 or whether a new term is starting in the geographic query 12. Another example includes the machine learning models 22 detecting a pause in the user 104 typing characters in the geographic query 12.

At 706, the method 700 includes foregoing providing a query expansion if the user is not at a mental pause point in the geographic query. The machine learning models 22 may determine to forego performing the query expansion 16 if the user 104 is not at a mental pause point in the geographic query 12, and the method 700 may end.

At 708, the method 700 may optionally include determining whether the user is likely to select the query expansion. If the user 104 is at a mental pause point in the geographic query 12, the machine learning models 22 may also perform a gate function to determine whether to perform the query expansion 16 (e.g., is the user 104 likely to select the query expansion 16). The machine learning models 22 may use a variety of categories in determining whether to perform the query expansion 16. The variety of categories may be used in determining the likelihood of use 34 of the query expansion 16 by the user 104 and/or the predicted accuracy 32 of the query expansion 16.

The categories may include features related to the prefix 14 (e.g., how many characters, how many terms, whether the prefix 14 contains a number). The categories may also include features related to individual entities in the suggestions provided by the Auto-complete (e.g., are the suggestions a place, an address, or a business, and/or how far the suggestions are from a location of the user). The categories may also include features related to both the prefix and the individual entities provided in the Auto-complete suggestions (e.g., how similar (cosine similarity) is the prefix to the suggestion). The categories may also include features related to all suggestions provided by the Auto-complete (e.g., what is the consensus for a word or phrase expansion among all suggestions). The machine learning models 22 may predict a likelihood of use 34 of the query expansion 16 and also may predict an accuracy 32 of the query expansion 16. As such, even if the user 104 is at a mental pause point in the geographic query 12, the machine learning models 22 may perform additional processing to determine whether to perform the query expansion 16.

The machine learning models 22 may use the training sets 38 of data to determine the likelihood of use 34 of the query expansion 16 and/or the predicted accuracy 32 of the query expansion 16. By determining the predicted accuracy 32 of the query expansion 16, the machine learning models 22 may prevent ambiguous results for the prefix 14 by waiting to perform the query expansion 16 until the predicted accuracy 32 exceeds the threshold 36.

At 710, the method 700 may optionally include foregoing providing a query expansion if the likelihood of the user selecting the query expansion is below the threshold. If the likelihood of use 34 and/or the predicted accuracy 32 are below the threshold 36, the machine learning models 22 may determine that the user is unlikely to select the query expansion 16 and may forego providing the query expansion 16.

At 712, the method 700 includes providing the query expansion if the user is at a mental pause point in the geographic query. The machine learning models 22 may provide the query expansion 16 in response to determining that the user 104 is at a mental pause point in the geographic query 12. At mental pause points (e.g., when the user 104 stops typing), the user 104 is more receptive to a list of suggestions.

The method 700 may optionally include providing the query expansion if the likelihood of the user selecting the query expansion exceeds the threshold. In addition to being at a mental pause point in the geographic query 12, the machine learning models 22 may provide the query expansion 16 if the likelihood of use 34 of the query expansion 16 and/or the predicted accuracy 32 exceeds the threshold 36.

The query expansion 16 may be a word expansion 28 or a phrase expansion 30. The machine learning models 22 may limit the query expansion 16 based on the predicted accuracy 32. As such, the machine learning models 22 may provide a query expansion 16 (partial expansion or full expansion) based on the mental pause point of the user 104, the likelihood of use 34 of the query expansion 16 by the user, and/or the predicted accuracy 32 of the query expansion 16.

As such, the method 700 may be used to perform a gatekeeping function to determine when to provide geographic suggestions to the user 104.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a classification model, a binary model, a regression model, a language model, an object detection model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing, predicting, inferring, and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

INDUSTRIAL APPLICABILITY

The present disclosure is related to methods and systems for using maps Auto-complete to help users formulate a correct query by providing query expansions derived from a top set of suggestions in the Auto-complete ranked list of recommendations for the query prefix. The query expansion may be a word or phrase expansion based on the suggestions provided by the Auto-complete for the query prefix. The methods and systems automatically complete the query prefix with the query expansion. The users may use the query expansion to complete the map searching.

The methods and systems use machine learning models to decide when to use query expansion for the query prefix. In some implementations, the query expansion is provided at a mental pause point in the query prefix. A mental pause point occurs after the user completes a term (e.g., a word, a number, an acronym, or an abbreviation) in the query prefix or before starting to type a new term in the query prefix. As such, a mental pause point may occur when the user pauses typing the query prefix. The machine learning models also decide what query expansion to derive from the Auto-complete suggestions. The words and/or phrases used in the query expansion may be derived from a top ranked suggestion. The machine models determine whether to provide a word expansion or a phrase expansion.

A combination of different machine learning models may be used for the query expansions. In an implementation, the machine learning models include two binary gating models (a word expansion model and a phrase expansion model). The machine learning models may also include a gradient boosting decision trees model (e.g., a LightGBM).

The query expansion may be visually distinct from the query prefix (e.g., a different color) so that the user may easily identify the query expansion. By generating word or phrase query expansions, users are more likely to engage with the Auto-complete suggestions. Moreover, query expansion helps users formulate a query faster, especially when unfamiliar and hard to spell geographic entity names are used in the query prefix. The methods and systems use query expansion seamlessly with Auto-complete without additional overhead to users.

As such, the methods and systems facilitate the user experience in map searching by using query expansions to automatically expand the prefix of the geographic query with words or phrases. The query expansion allows the user to reach a mental point faster without introducing noise in the geographic query. The methods and systems increase a likelihood of receiving the correct results for a geographic query by determining the words and phrases to include in the query expansion based on a highest ranked candidate result in a list of ranked candidate results of suggestions provided by the Auto-complete service for the map application.

One technical advantage of some implementations of the present disclosure is compute savings. For every character that is typed in a map search, a request may be sent to backend servers to retrieve suggestions and rank the suggestions for the typed characters, which results in high queries per second on the servers and lots of computations by the servers. By using query expansion, the number of characters typed by the user may be reduced by a third or a half, resulting in a reduction in processing costs and the demand on the servers by providing less queries on typed characters.

Another technical advantage of some implementations of the present disclosure is providing the query expansion at a mental pause point in the query (e.g., when the user stops typing after a term in the query or before starting a new term in the query). By providing the query expansion and/or the ranked suggestions at a break or pause in creating the query, the user is more likely to be receptive to the query expansion or the suggestions. Moreover, the query expansions allows the user to reach a mental pause point faster without introducing noise in the query.

The methods and systems provide benefits to map searching by helping users engage with Auto-complete by using query expansion to find the results quicker for a geographic query. The methods and systems facilitate the user experience in map searching by reducing the time to reach the intent of a geographic query and increase a likelihood of receiving the correct results for a geographic query.

(A1) Some implementations include a method for suggesting geographic results to a user. The method includes receiving (602) a prefix (e.g., prefix 14) of a geographic query (e.g., geographic query 12). The method includes ranking (604) received candidate results (e.g., candidate results 24) for the prefix of the geographic query. The method includes based on the ranked candidate results (e.g., list of ranked candidate results 18), providing (606) a query expansion (e.g., query expansion 16) of a highest ranked candidate result (e.g., highest ranked candidate result 26).

(A2) In some implementations of the method of A1, the two binary gating models include a phrase model and a word model.

(A3) In some implementations of the method of A1 or A2, if the phrase model has a lower confidence score than the word model, the query expansion is a word expansion (e.g., word expansion 28), and if the phrase model has the same or higher confidence score as the word model, the query expansion is a phrase expansion (e.g., phrase expansion 30).

(A4) In some implementations of the method of any of A1-A3, the prefix of the geographic query includes a whole word, a whole phrase, or a number.

(A5) In some implementations of the method of any of A1-A4, the mental pause point in the geographic query occurs after completing a word, a number, an acronym, or an abbreviation in the prefix of the geographic query.

(A6) In some implementations, the method of any of A1-A5 includes aggregating a list of the ranked candidate results based on the prefix of the geographic query; and displaying the list of the ranked candidate results.

(A7) In some implementations of the method of any of A1-A6, the ranking is based at least on a distance of the ranked candidate results to a current location of the user (e.g., user 104).

(A8) In some implementations, the method of any of A1-A7 includes displaying a list of the ranked candidate results.

(A9) In some implementations of the method of any of A1-A8, one or more machine learning models (e.g., machine learning models 22) ranks the candidate results and provides the query expansion.

(A10) In some implementations of the method of any of A1-A9, the two binary gating models use features related to the prefix or features related to the candidates in the ranked candidate results in providing the query expansion.

(A11) In some implementations of the method of any of A1-10, the features related to the prefix include one or more of a length of the prefix or whether the prefix is a numeric prefix, and the features related to the candidates in the ranked candidate results include one or more of a similarity of the prefix to the candidates or whether the query expansion is supported by the candidates in the list of the ranked candidate results.

(A12) In some implementations of the method of any of A1-A9, the query expansion is visually distinct from the prefix.

(B1) Some implementations include a method for suggesting geographic results to a user. The method includes receiving (702) a prefix (e.g., prefix 14) of a geographic query (e.g., geographic query 12). The method includes determining (704) whether the user (e.g., the user 104) is at a mental pause point in the geographic query. The method includes if the user is not at the mental pause point, foregoing (706) providing the query expansion (e.g., query expansion 16). The method includes if the user is at the mental pause point, providing (712) the query expansion by automatically updating the prefix of the geographic query with the query expansion.

(B2) In some implementations of the method of B1, the mental pause point occurs after the user completes a term in the geographic query or starts to type a new term.

(B3) In some implementations of the method of B1 or B2, the term includes one or more of a word, a number, an acronym, or an abbreviation.

(B4) In some implementations of the method of any of B1-B3, the query expansion is a partial expansion of the geographic query or a full expansion of the geographic query.

(B5) In some implementations of the method of any of B1-B4, the query expansion is a word expansion or a phrase expansion.

(B6) In some implementations of the method of any of B1-B5, the query expansion is based on a list of ranked candidate results (e.g., list of ranked candidate results 26).

(B7) In some implementations, the method of any of B1-B6 includes determining (708) whether the user is likely (e.g., likelihood of use 34) to select the query expansion; and if the user is likely to select the query expansion, providing the query expansion.

(B8) In some implementations of the method of any of B1-B7, whether the user is likely to select the query expansion is based on a length of the prefix.

(B9) In some implementations of the method of any of B1-B8, whether the user is likely to select the query expansion is based on whether the query expansion is supported by candidates in the list of the ranked candidate results.

(B10) In some implementations of the method of any of B1-B11, whether the user is likely to select the query expansion is based on whether the prefix is a numeric prefix.

Some implementations include a system (environment 100). The system includes one or more processors; memory in electronic communication with the one or more processors; and instructions stored in the memory, the instructions being executable by the one or more processors to perform any of the methods described here (e.g., A1-A12, B1-B10).

Some implementations include a computer-readable storage medium storing instructions executable by one or more processors to perform any of the methods described here (e.g., A1-A12, B1-B10).

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for suggesting geographic results to a user, comprising:
   providing a user interface comprising an input field;
   receiving a prefix of a geographic query in the input field of the user interface;
   ranking received candidate results for the prefix of the geographic query;
   predicting an accuracy of a query expansion using the candidate results, wherein the accuracy comprises a confidence score based on the likelihood of the user selecting the candidate results; and
   based on the ranked candidate results, providing the query expansion of a highest ranked candidate result using two binary gating models in response to the predicted accuracy of the query expansion exceeding a threshold,
   wherein the two binary gating models include a phrase model and a word model,
   wherein if the phrase model has a lower confidence score than the word model, the query expansion is a word expansion, and
   if the phrase model has a same or higher confidence score as the word model, the query expansion is a phrase expansion;
   wherein the query expansion is provided at a mental pause point in the geographic query and the prefix of the geographic query is automatically updated with a full query expansion in the input field in response to the predicted accuracy of the query expansion exceeding the threshold and a partial expansion in response to the predicted accuracy being below the threshold,
   wherein the full query expansion includes additional characters beyond the partial expansion;
   providing, based on execution of the query, a ranked results list to the user in the user interface.

2. The method of claim 1, wherein the prefix of the geographic query includes one or more of a whole word, a whole phrase, or a number.

3. The method of claim 1, wherein the mental pause point in the geographic query occurs after completing a word, a number, an acronym, or an abbreviation in the prefix of the geographic query.

4. The method of claim 1, further comprising:
aggregating a list of the ranked candidate results based on the prefix of the geographic query; and
displaying the list of the ranked candidate results.

5. The method of claim 1, wherein the ranking is based at least on a distance of the ranked candidate results to a current location of the user.

6. The method of claim 1, further comprising:
displaying a list of the ranked candidate results.

7. The method of claim 1, wherein the two binary gating models use features related to the prefix or features related to candidates in the ranked candidate results in providing the query expansion.

8. The method of claim 7, wherein the features related to the prefix include one or more of a length of the prefix or whether the prefix is a numeric prefix, and
the features related to the candidates in the ranked candidate results include one or more of a similarity of the prefix to the candidates or whether the query expansion is supported by the candidates in a list of the ranked candidate results.

9. The method of claim 1, wherein the full query expansion includes a full expansion of the geographic query.

10. A method for suggesting geographic results to a user, comprising:
providing a user interface comprising an input field;
receiving a prefix of a geographic query in the input field of the user interface;
determining whether the user is at a mental pause point in the geographic query;
if the user is not at the mental pause point, foregoing providing a query expansion until the user is at the mental pause point; and
if the user is at the mental pause point:
predicting an accuracy of the query expansion, wherein the accuracy comprises a confidence score based on the likelihood of the user selecting a set of candidate results provided based on the prefix of the geographic query; and
based on the ranked candidate results, providing the query expansion of a highest ranked candidate result using two binary gating models in response to the predicted accuracy of the query expansion exceeding a threshold,
wherein the two binary gating models include a phrase model and a word model,
wherein if the phrase model has a lower confidence score than the word model, the query expansion is a word expansion, and
if the phrase model has a same or higher confidence score as the word model, the query expansion is a phrase expansion;
wherein the full query expansion includes a full expansion in the input field of the geographic query including additional sufficient characters beyond the partial expansion to be successfully executed by a user to search the geographical location;
providing, based on execution of the query, a ranked results list to the user in the user interface.

11. The method of claim 10, wherein the mental pause point occurs after the user completes a term in the geographic query or starts to type a new term and the term includes one or more of a word, a number, an acronym, or an abbreviation.

12. The method of claim 10, wherein the query expansion is a word expansion or a phrase expansion.

13. The method of claim 10, wherein the query expansion is based on a list of ranked candidate results.

14. The method of claim 10, further comprising:
determining whether the user is likely to select the query expansion; and
if the user is likely to select the query expansion, providing the query expansion.

15. The method of claim 14, wherein determining whether the user is likely to select the query expansion is based on one or more of a length of the prefix, whether the prefix is a numeric prefix, or whether the query expansion is supported by candidates in a list of the ranked candidate results.

16. A system, comprising:
one or more processors;
memory in electronic communication with the one or more processors; and
instructions stored in the memory, the instructions executable by the one or more processors to:
provide a user interface comprising an input field;
receive a prefix of a geographic query in the input field of the user interface;
rank received candidate results for the prefix of the geographic query;
predict an accuracy of a query expansion using the candidate results, wherein the accuracy comprises a confidence score based on the likelihood of the user selecting the candidate results; and
based on the ranked candidate results, provide the query expansion of a highest ranked candidate result using two binary gating models in response to the predicted accuracy of the query expansion exceeding a threshold such that the query expansion is executable by a user,
wherein the two binary gating models include a phrase model and a word model,
wherein if the phrase model has a lower confidence score than the word model, the query expansion is a word expansion, and
if the phrase model has a same or higher confidence score as the word model, the query expansion is a phrase expansion;
wherein the query expansion is provided at a mental pause point in the geographic query and the prefix of the geographic query is automatically updated with a full query expansion in the input field in response to the predicted accuracy of the query expansion exceeding a threshold and a partial expansion in response to the predicted accuracy being below the threshold,
wherein the full query expansion includes additional characters beyond the partial expansion, wherein the query expansion is visually distinct from the prefix as the query expansion is visually distinct from characters entered by the user;
provide, based on execution of the query, a ranked results list to the user in the user interface.

17. The method of claim 1, wherein the query expansion is limited to a partial expansion based on the predicted accuracy.

18. The method of claim 1, further comprising:
performing the query expansion in response to a predicted likelihood of use of the query expansion exceeding a threshold.

* * * * *